United States Patent
Fuchigami

(10) Patent No.: US 10,924,635 B2
(45) Date of Patent: Feb. 16, 2021

(54) IMAGE PROCESSING APPARATUS AND IMAGE PROCESSING METHOD

(71) Applicant: TOSHIBA TEC KABUSHIKI KAISHA, Tokyo (JP)

(72) Inventor: Takahiro Fuchigami, Yokosuka Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 138 days.

(21) Appl. No.: 16/353,456

(22) Filed: Mar. 14, 2019

(65) Prior Publication Data
US 2020/0296257 A1    Sep. 17, 2020

(51) Int. Cl.
*H04N 1/60* (2006.01)
*G06K 15/02* (2006.01)
*H04N 1/58* (2006.01)

(52) U.S. Cl.
CPC ....... *H04N 1/6072* (2013.01); *G06K 15/1848* (2013.01); *H04N 1/58* (2013.01)

(58) Field of Classification Search
CPC ..... H04N 1/6072; H04N 1/58; G06K 15/1848
See application file for complete search history.

(56) References Cited

U.S. PATENT DOCUMENTS 9,736,334 B2    8/2017  Ikari

*Primary Examiner* — Christopher Wait
(74) *Attorney, Agent, or Firm* — Kim & Stewart LLP

(57) ABSTRACT

According to one embodiment, an image processing apparatus includes a scanner to generate image data by scanning a document and a control unit. The control is configured to set, for each pixel in the image data, a second pixel value based on a first pixel value and a difference between a first base value corresponding to a base color of the document and a second base value that is based on neighboring pixel values around the pixel. A correction table is used to obtain a corrected second pixel value for each pixel. A third pixel value for each pixel is set based on the corrected second pixel value and the difference between the first and second base values.

20 Claims, 7 Drawing Sheets

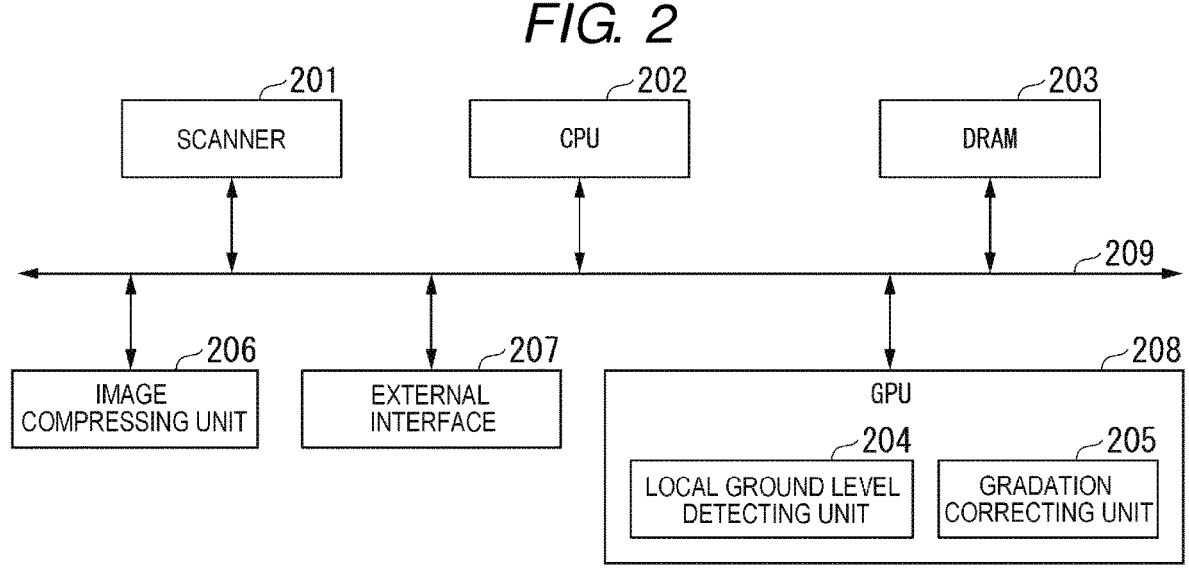
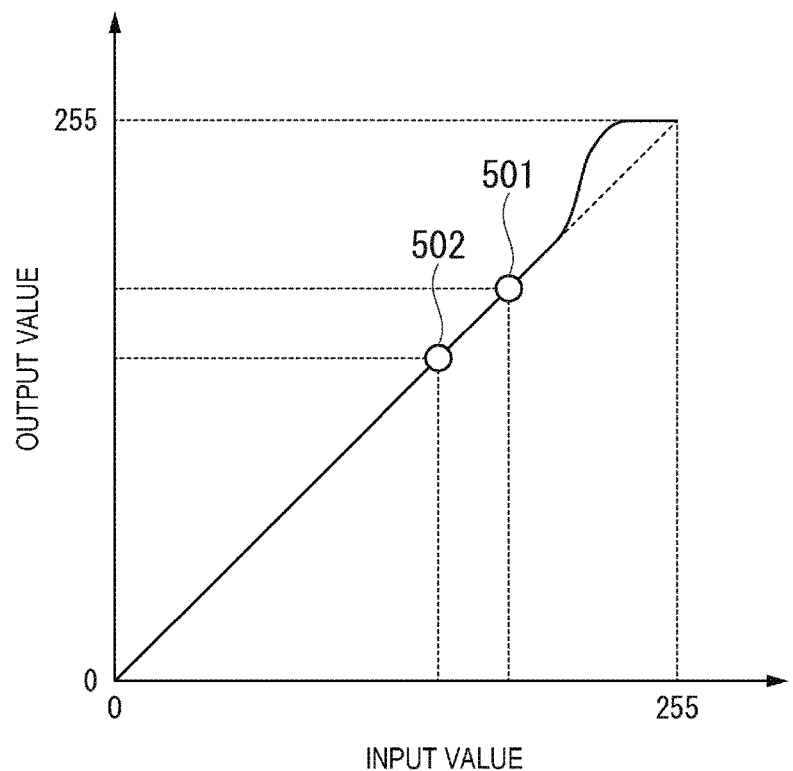

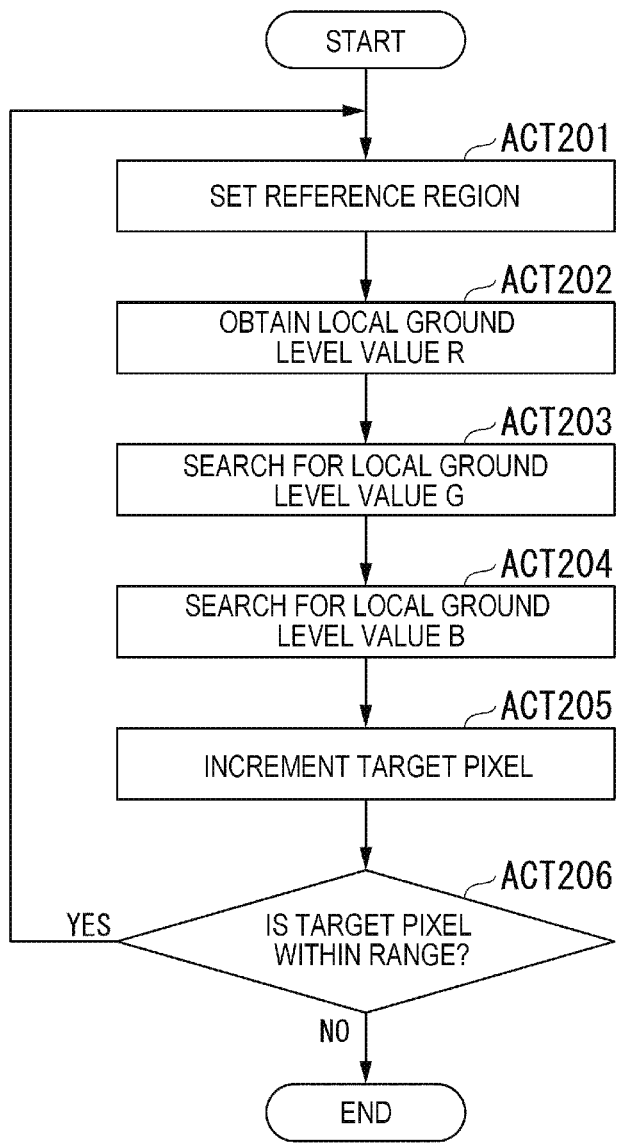

FIG. 8
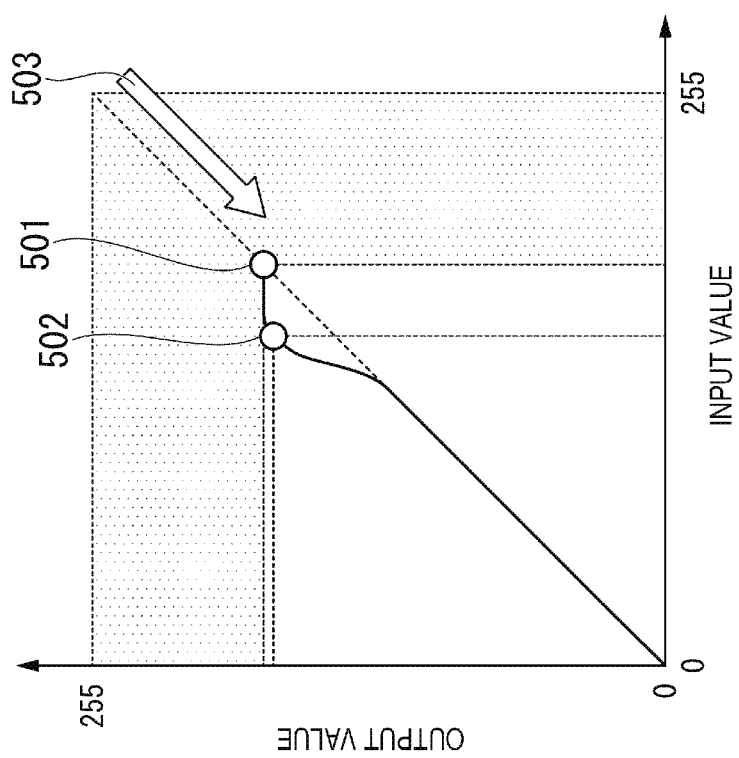
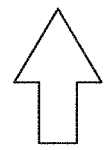
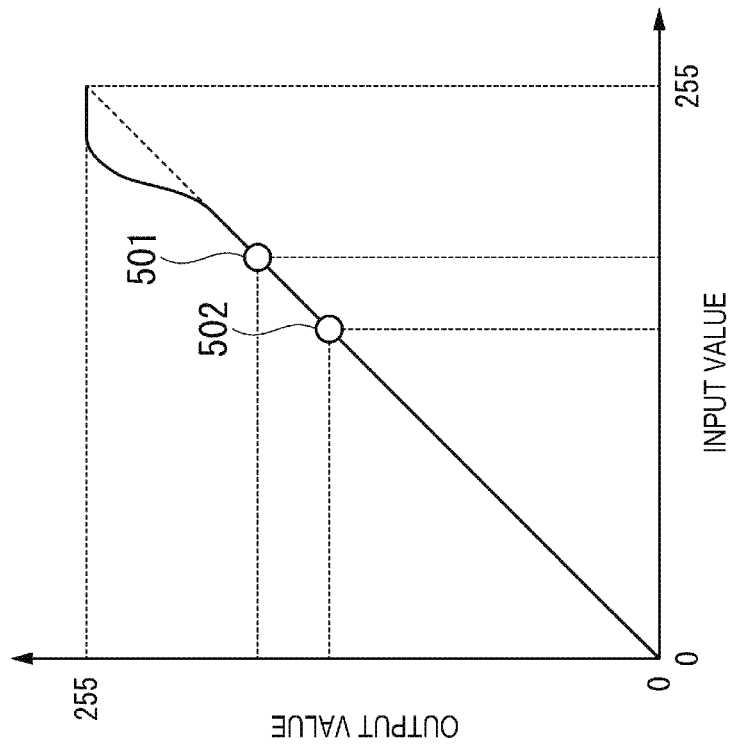

FIG. 9
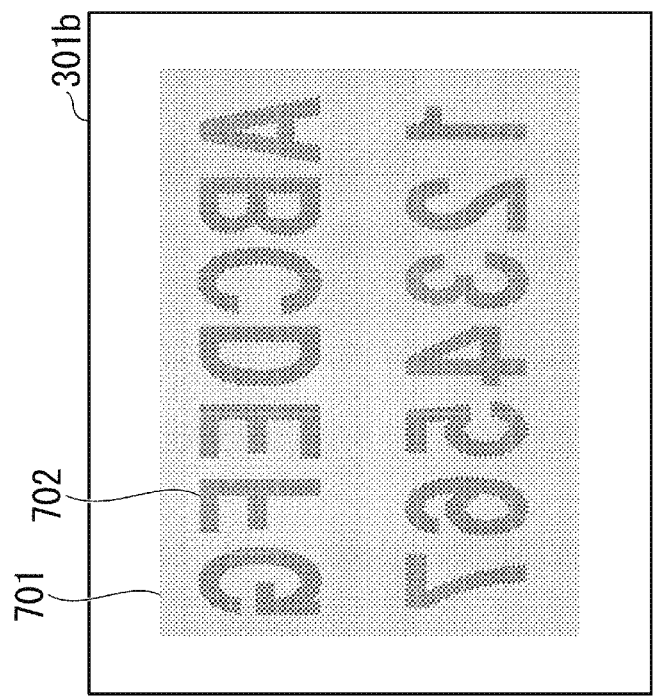
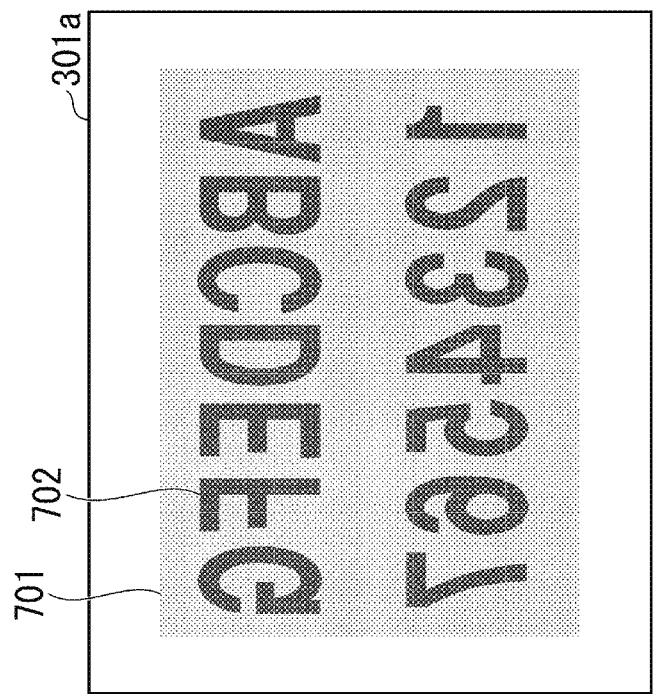

IMAGE PROCESSING APPARATUS AND IMAGE PROCESSING METHOD

FIELD

Embodiments described herein relate generally to an image processing apparatus and an image processing method.

BACKGROUND

Often, when a document has images printed on both sides of a sheet, images from one side may "show through" on the other side when the document is read or electronically scanned. In this context, "show-through" is a phenomenon in which an image or text on the side of the document being read is marred or obscured by an image or text on the other side the document. One known technique for removing or correcting for "show-through," is a technique of performing a background removal processing on the image data generated via a reading process. The background removal process is a process of converting gradation information so that pixel values in a light density range of the image data approaches a white pixel data value. Here, a "light density range" refers to a relatively low image density area, such as would be present in a text background portion of an image or a whitespace, background, or the like, of an image.

However, when a base color (background color) of the document or at least a portion thereof is not intended to be white, then there will be a region in which the base color will not correspond to the particular light density range. In such a case, the show-through phenomenon cannot be corrected in the region of the document having the non-white base color by the background removal process.

DESCRIPTION OF THE DRAWINGS

FIG. 2 depicts a hardware configuration of an image reading unit.

FIG. 3 depicts aspects of a pixel value correction.

FIG. 4 is a flowchart depicting aspects of processes of a local ground level detecting unit.

FIG. 8 schematically illustrating aspects of a correction processing.

FIG. 9 depicts an example of image data after correction processing.

DETAILED DESCRIPTION

In general, according to one embodiment, an image processing apparatus comprises a scanner to generate image data by scanning a document. The image data from the scanner comprises a plurality of pixels, each pixel in the image data respectively having a first pixel value corresponding to a brightness value of the pixel. A control unit is configured to set, for each pixel in the image data, a second pixel value based on the first pixel value of the pixel and a first difference between a first base value corresponding to a base color of the document and a second base value that is based on neighboring first pixel values of a plurality of neighboring pixels around the pixel. The control unit uses a correction table to obtain, for each pixel in the image data, a corrected second pixel value. The control unit then sets a third pixel value based on the corrected second pixel value and the first difference.

Hereinafter, an image processing apparatus according to an example embodiment is described with reference to drawings.

Figure 1:
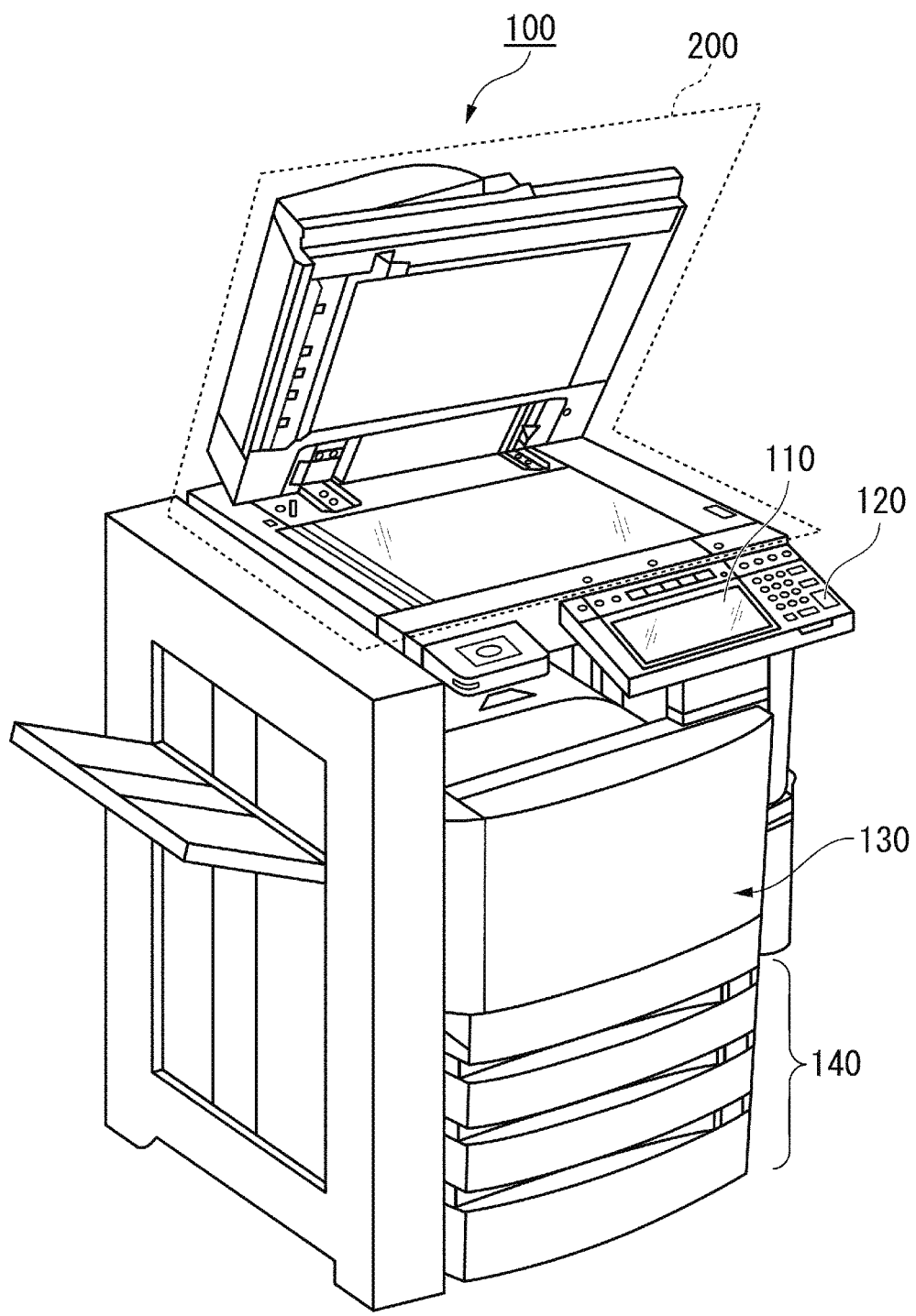
FIG. 1 depicts an overall configuration of an image processing apparatus.

FIG. 1 is an external view illustrating an overall configuration of an image processing apparatus 100 according to an embodiment. The image processing apparatus 100 is, for example, an image forming apparatus such as a multifunction printer, a multi-functional peripheral (MFP) or the like. The image processing apparatus 100 includes a display 110, a control panel 120, a printer 130, a sheet accommodating unit 140, and an image reading unit 200. Here, the printer 130 may be an electrophotographic device that fixes a toner image to a sheet or may be an inkjet device which ejects ink on a sheet.

The image processing apparatus 100 generates digital data by scanning an image on a sheet and generates an image file therefrom. The sheet is, for example, a document, a paper on which text, graphics, or the like has been printed or otherwise formed. In general, the sheet may be of any type and/or material as long as the image processing apparatus 100 is able to read the sheet.

The display 110 is an image display device such as a liquid crystal display or an organic electro luminescence display. The display 110 displays information related to operations and/or functions of the image processing apparatus 100.

The control panel 120 includes a plurality of buttons. The control panel 120 receives inputs from a user, such as those accompanying pressing or selection of one or more buttons of the control panel 120. The control panel 120 outputs signals to a control unit of the image processing apparatus 100 according to inputs performed by the user. The display 110 and the control panel 120 may be configured as an integrated touch panel in some examples.

The printer 130 forms an image on a sheet based on image information generated by the image reading unit 200 or image information received via a network communication path or the like. In some examples, an image forming unit of the printer 130 forms an electrostatic latent image on a photoconductive drum based on the image information generated or received. The image forming unit then forms an initial image by attaching a developer onto the electrostatic latent image. A specific example of the developer includes toner. An image transfer unit of the printer 130 then transfers the initial image to the sheet. A fixing unit of the printer 130 fixes the image on to the sheet by heating and applying pressure. The sheet on which the image is formed may be accommodated in the sheet accommodating unit 140 or may be a sheet chosen by the user.

The sheet accommodating unit 140, in general, accommodates sheets to be used by the printer 130 in printing processes.

The image reading unit 200 reads image information from an original document by contrast of light. The image reading unit 200 records the image information that has been read from an original document. In some instances, the recorded image information may be transmitted to another information processing apparatus via a network connection. After reading, the recorded image information can also then be printed on a sheet by the printer 130.

FIG. 2 is a diagram illustrating an example of a hardware configuration of the image reading unit 200 according to an embodiment.

The image reading unit 200 includes a scanner 201, a central processing unit (CPU) 202, and a dynamic random access memory (DRAM) 203. The image reading unit 200 further includes an image compressing unit 206, an external interface 207, and a graphics processing unit (GPU) 208. Each of these components is connected through a bus 209. The CPU 202 and the GPU 208 may cooperate to execute a program stored in a memory to realize a local ground level detecting unit 204 and a gradation correcting unit 205. In some examples, the CPU 202 may operate alone (i.e., without GPU 208) to execute a program to realize the local ground level detecting unit 204 and the gradation correcting unit 205.

The scanner 201 generates image data by scanning a document or the like. In the present embodiment, the scanner 201 generates image data expressed in an RGB (Red, Green, Blue) color space.

Although not specifically illustrated, the scanner 201 may include a charge-coupled device (CCD) sensor, a scanner lamp, a scanning optical system, a condensing lens, and the like. A CCD sensor can be covered with the three types of RGB filters, convert received light into an electric signal, and generate image data comprising a color value for each RGB color for a plurality of pixels. The scanner lamp illuminates an image on the document to be read. The scanning optical system is mounted with a mirror for changing an optical path of reflected light from the document being read. The condensing lens focuses the reflected light from the document.

The CPU 202 stores image data output from the scanner 201 in the DRAM 203 and outputs the image data to the local ground level detecting unit 204. The local ground level detecting unit 204 obtains a local ground level value of each pixel of the image data. The local ground level value indicates a base color of a region proximate to the pixel. In this context, a base color is the color of a region that does not include a portion of an illustration, a text character, or the like. That is, in general, the base color refers to the color of a background region of the read document data. Details about processes of the local ground level detecting unit 204 will be described later with reference to FIG. 4.

The CPU 202 outputs the image data processed by the local ground level detecting unit 204 to the gradation correcting unit 205. The gradation correcting unit 205 adjusts each pixel value of the image data based on the local ground level value obtained by the local ground level detecting unit 204. The gradation correcting unit 205 performs gradation converting based on a pixel value correction table or the like. Details about processes of the gradation correcting unit 205 will be described later with reference to FIG. 7.

FIG. 3 is a diagram illustrating aspects of a pixel value correction method. FIG. 3 illustrates a pixel value correction method when the color space of image data is RGB. While FIG. 3 depicts a pixel value correction method using an XY graph, the correction method may be implemented as a corresponding correction table or other lookup method. The horizontal axis of FIG. 3 represents an input pixel value (input value) and the vertical axis represents a corrected pixel value (output value). In general, correction would be performed independently for each of red, green, and blue color values.

The correction illustrated in FIG. 3 has a correspondence relationship in which an output pixel value (corrected pixel value) becomes larger than an input pixel value for those pixel values included in the light density range. When the color space of image data is standard RGB, the light density range is the range in which a gradation value of the pixel is close to 255. The correction does not substantially change output value of an input pixel that is outside the light density range (that is, not near a gradation value of 255).

Based on the correction illustrated in FIG. 3, a pixel value of a pixel in the light density range is corrected such that the output pixel value is increased relative to the input value. In other words, a bright image approaches a white background. As a result, a bright image generated in a white background region of the image data is removed, and a show-through image is removed or reduced.

Here, as illustrated in FIG. 3, the labeled pixel values 501 and 502 are not included in the light density range. The labeled pixel values 501 and 502 correspond to colors having different hues. Thus, when a base color of the image data is not a white background but is rather a color hue corresponding to the labeled pixel value 501 or 502, or the like, a output pixel value is not changed from the input pixel value. Accordingly, when a show-through occurs in a region of a non-white base color, the show-through image would not be removed or reduced. Thus, in the present disclosure, a pixel correction is performed according to the local ground level detecting unit 204 and the gradation correcting unit 205.

The CPU 202 outputs image data that has been processed by the gradation correcting unit 205 to the image compressing unit 206. The image compressing unit 206 performs a compression on the image data as corrected by the gradation correcting unit 205. The image compressing unit 206 converts the image data to, for example, a Joint Photographic Experts Group (JPEG) format or the like. The compressed image can be transmitted to an external device, a hard disk, or the like via the external interface 207.

In some examples, the local ground level detecting unit 204, the gradation correcting unit 205, and the image compressing unit 206 are configured as a hardware component or the like. For example, a hardware component is a graphics processing unit (GPU), field programmable gate array (FPGA), or the like.

Processes of the local ground level detecting unit 204 are described below with reference to FIGS. 4 through 6. Processes of the gradation correcting unit 205 are described with reference to FIGS. 7 and 8. In the present example, a color space of image data being processed is RGB.

FIG. 4 is a flowchart illustrating the processes of the local ground level detecting unit 204. The local ground level detecting unit 204 selects a target pixel from the pixels in image data. For example, the local ground level detecting unit 204 sequentially selects as a target pixel each pixel along a raster scan direction of the image data.

The local ground level detecting unit 204 sets a reference region for the target pixel (ACT 201). The reference region is a region surrounding the target pixel within a certain range from the target pixel. The reference region includes a plurality of pixels positioned around the target pixel.

Figure 5:
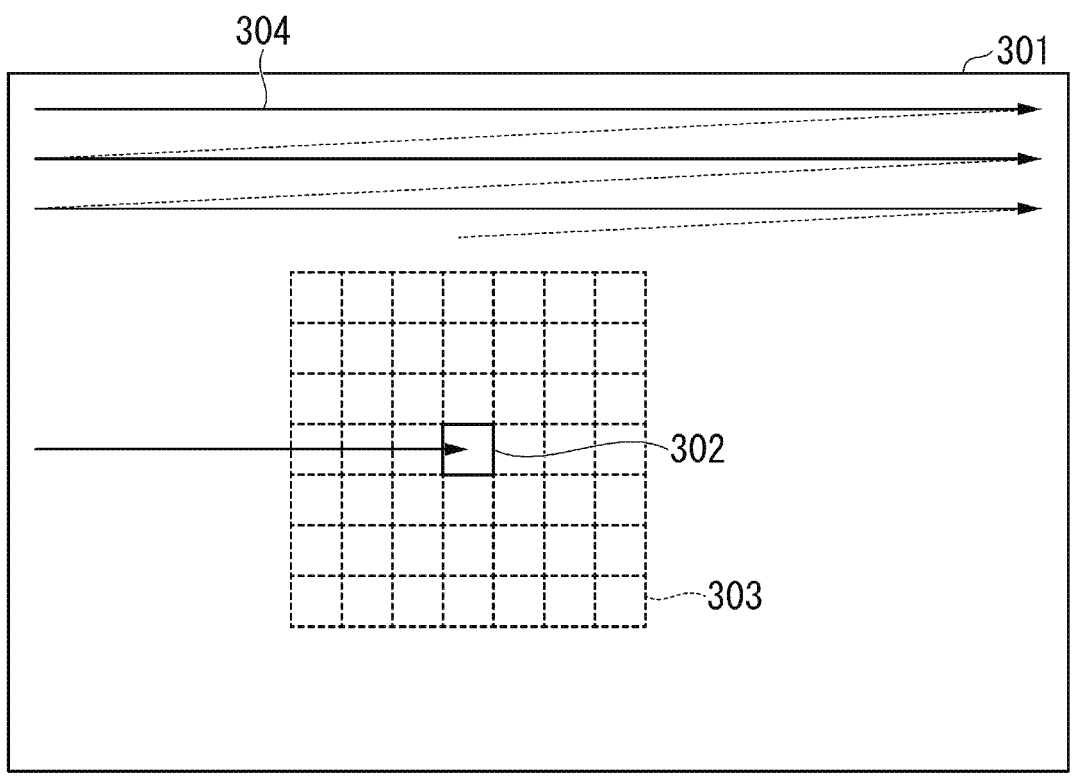
FIG. 5 is a diagram illustrating a reference region of image data.

FIG. 5 is a diagram illustrating a reference region 303 in the image data 301. As described above, the local ground level detecting unit 204 sequentially selects a target pixel 302 from the pixels in the image data along a raster scan direction 304.

Referring to FIG. 5, the reference region 303 is a region including a 7×7 pixel group centered on the particular target pixel 302. The local ground level detecting unit 204 changes the 7×7 pixel group according to the particularly selected target pixel 302.

In general, the size of the reference region 303 is not limited to 7×7. The size of the reference region 303 may be set according to the image type of the image data 301. For example, the local ground level detecting unit 204 may change the size of the reference region 303 according to whether the image data corresponds to a photograph, a document, or other type.

Alternatively, the local ground level detecting unit 204 may set the size of the reference region 303 according to a detected contrast level in image data. For example, the reference region 303 for the image data 301 having a high contrast can be set to be a small size (e.g., less than 7×7). On the other hand, the reference region 303 for the image data 301 having a low contrast can be set to be a large size.

A reference region 303 for a target pixel 302 positioned at or near an edge of the image data 301 might have to extend beyond the edge of the image to have its set size (e.g., 7×7). However, in such a case, the local ground level detecting unit 204 may simply omit any portion of the reference region 303 that would otherwise be outside (beyond an edge of) the image data 301.

Referring back to FIG. 4, the local ground level detecting unit 204 obtains a local ground level value for each RGB color for the target pixel (ACT 202 to ACT 204). In other words, the local ground level detecting unit 204 obtains local ground level values 'Rmax', 'Gmax', and 'Bmax'.

A local ground level value of a target pixel is based on each pixel value in a reference region. In other words, a local ground level value corresponds to a base color of the reference region. In this context, a base color is, for example, a background region color that is different from a color corresponding to a portion of illustration, a text character, or the like. The background regions tend to have high brightness compared to the regions of illustration, text character, or the like. Thus, the local ground level detecting unit 204 typically obtains a pixel value having a high brightness as the local ground level value.

The reference region may also include pixels having base colors with different hues. In this case, the local ground level value may be a value close in value to the target pixel. Here, processes for obtaining the local ground level value when the reference region includes a plurality of base colors having different hues are described with reference to FIG. 6.

Figure 6:
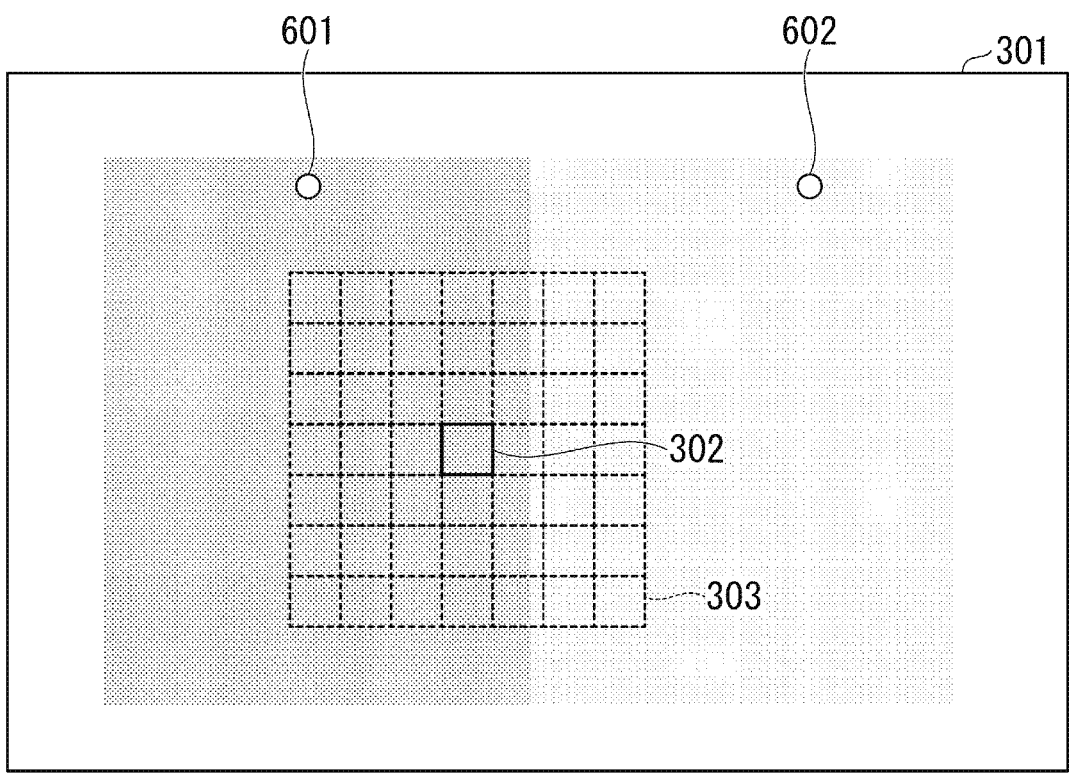
FIG. 6 is a diagram illustrating a reference region including base colors having different hues.

FIG. 6 is a diagram illustrating a reference region 303 including a plurality of types of base color having different hues. The reference region 303 of FIG. 6 includes two base colors 601 and 602 having different hues from each other. Here, the base color 602 has higher brightness than the base color 601. In this example, the determined local ground level value corresponds to a pixel value of the base color 602. However, in this instance, the hue of the target pixel 302 is closer to the base color 601 than to the base color 602. Thus, it would be preferable that the local ground level value be set to the base color 601 instead of base color 602.

Accordingly, the local ground level detecting unit 204 is configured to set the local ground level value to a pixel value having the higher brightness when the difference between the initially calculated local ground level and the target pixel is less than or equal to a first threshold value. In the example of FIG. 6, the difference between the pixel value of the target pixel and the pixel value corresponding to the base color 602 is greater than the first threshold value. Thus, the pixel value of the base color 601, which has a difference between the pixel value of the target pixel that is within the first threshold value and a brightness that is higher than the target pixel is set as the local ground level value.

Referring back to FIG. 4, the local ground level detecting unit 204 obtains a maximum value for R (red) level (Rmax) among the reference region 303 pixels and when the difference between the maximum value (Rmax) and the R level of the target pixel 302, the local ground level value is set to Rmax (ACT 202). The local ground level detecting unit 204 then preforms a similar processing on the reference region 303 for the G (green) level (Gmax) (ACT 203) and a similar processing on the reference region 303 for B (blue) level (Bmax) (ACT 204).

The local ground level detecting unit 204 increments the position of the target pixel along the raster scan direction (ACT 205). The local ground level detecting unit 204 determines whether the newly selected target pixel is within the range of image data (ACT 206). When the target pixel is within the range of image data (YES in ACT 206), processes from ACT 201 to ACT 205 are repeated for the new target pixel.

For each target pixel, the pixel(s) having the local ground level value for each RGB color might not be the same pixel. That is, for the same target pixel, pixel values of different pixels among the reference region may correspond to the determined local ground level value for the different RGB colors. Also, in this processing the first threshold value used with each RGB color may be different according to the RGB color.

Figure 7:
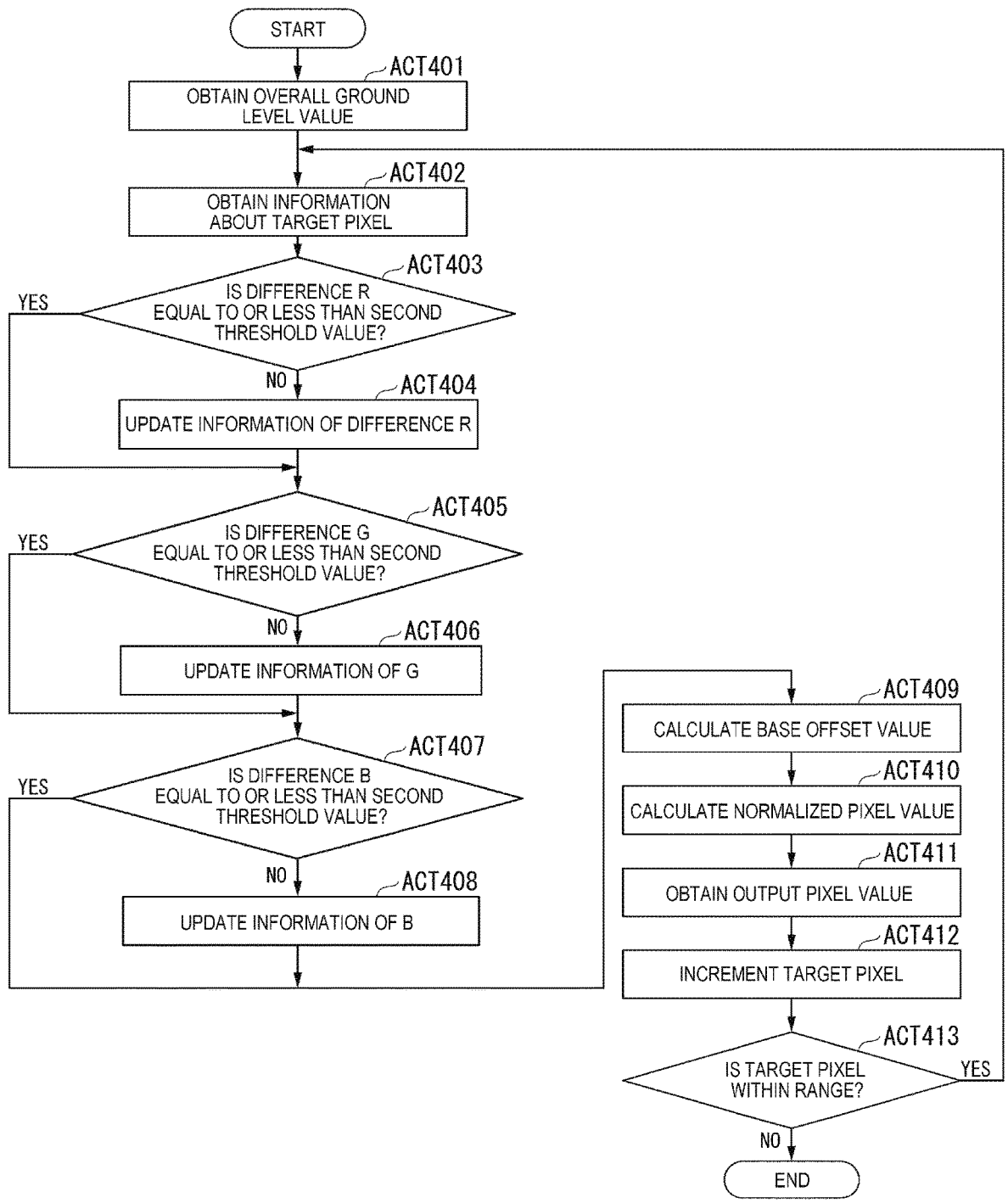
FIG. 7 is a flowchart depicting aspects of processes of a gradation correcting unit.

FIG. 7 is a flowchart illustrating processes of the gradation correcting unit 205. The gradation correcting unit 205 obtains ground level values 'Rgnd', 'Ggnd', and 'Bgnd' for an entire document/image (ACT 401). A ground level value of the entire document/image (hereinafter, referred to as an overall ground level value) is, for example, the color of the sheet being printed or a color of margin area of the sheet.

The overall ground level value may be a fixed value or may be obtained based on analysis of pixel values in image data. When the overall ground level value is obtained based on the pixel values in image data, the highest detected pixel brightness among the pixel values in image data can be set to the overall ground level value, for example.

When a color space of the image data is RGB, the overall ground level value is generally close to a RGB value 255, 255, 255. In the example embodiment, a case in which the overall ground level value is (Rgnd, Ggnd, Bgnd)=(254, 254, 254) is utilized.

The gradation correcting unit 205 selects a target pixel. The gradation correcting unit 205 obtains pixel values 'R', 'G', and 'B' for the target pixel and local ground level values 'Rmax', 'Gmax', and 'Bmax' (ACT 402). The local ground level values 'Rmax', 'Gmax', and 'Bmax' for the target pixel are obtained according to the flowchart of FIG. 4.

Next, the gradation correcting unit 205 obtains base offset values 'Rofs', 'Gofs', and 'Bofs' for the target pixel according to processes ACT 403 to ACT 409. The base offset values are respective differences between the overall ground level values 'Rgnd', 'Ggnd', and 'Bgnd' and the local ground level values 'Rmax', 'Gmax', and 'Bmax'.

The gradation correcting unit 205 calculates a difference (Rgnd−R) by subtracting a pixel R value from the overall ground level value Rgnd. The gradation correcting unit 205 determines whether the calculated difference is less than or equal to a second threshold value (ACT 403).

When the difference is greater than the second threshold value (NO in ACT 403), the color density of the target pixel is considered high. In this case, it may be determined that the target pixel is highly likely to correspond to an illumination or character region. The show-through phenomenon is more likely to occur in a region having lower color density or higher brightness. On the other hand, show-through hardly occurs in regions having high density or low brightness. Accordingly, when the target pixel has high density, the target pixel may be determined to be a pixel that is hard to show through.

Thus, when the difference is greater than the second threshold value, the target pixel is excluded from gradation converting. In particular, the gradation correcting unit 205 updates the local ground level value Rmax. In other words, the local ground level value Rmax is replaced by the overall ground level value Rgnd (ACT 404).

Also, as a result, the base offset value Rofs calculated in process ACT 409 is set to a value '0'. When the base offset value has the value '0', adjusting of a pixel value in process ACT 410 is not performed and the base offset value is excluded from the gradation converting. Details of the gradation converting will be described in detail below.

On the other hand, when the difference is less than or equal to the second threshold value (YES in ACT 403), the gradation correcting unit 205 does not update the local ground level value Rmax. In other words, the local ground level value Rmax obtained in ACT 202 (FIG. 4) is used. Similarly to the R values, the gradation correcting unit 205 updates a local ground level value according to a difference also for G values and a B values (ACT 405 to ACT 408). The second threshold value utilized in the processing may be different for each RGB color.

The gradation correcting unit 205 calculates the base offset values 'Rofs', 'Gofs', and 'Bofs' based on the local ground level value and the overall ground level value (ACT 409). The gradation correcting unit 205 calculates the base offset value by subtracting the overall ground level value from the local ground level value.

In particular, the gradation correcting unit 205 obtains the base offset value Rofs=Rmax−Rgnd. The gradation correcting unit 205 obtains the base offset value Gofs=Gmax−Ggnd. The gradation correcting unit 205 obtains the base offset value Bofs=Bmax−Bgnd.

Here, the local ground level values are (Rmax, Gmax, Bmax)=(230, 230, 230). As described above, the overall ground level values in this example are (Rgnd, Ggnd, Bgnd)=(254, 254, 254) and the values (Rofs, Gofs, Bofs)=(−24, −24, −24) are thusly calculated as the base offset values.

As such, when a color space of image data is an additive mixture type such as RGB or the like, an overall ground level value shows a value higher than a local ground level value. Thus, the calculated base offset values are negative values. On the other hand, when a color space of image data is of a subtractive mixture type such as CMYK (cyan, magenta, yellow, black) or the like, the calculated base offset values become positive values.

The base offset value of each RGB color for the target pixel is obtained through processes ACT 403 to ACT 409. When the difference between the overall ground value and the target pixel value is greater than the second threshold value (NO in ACT 403, ACT 405, and ACT 407), the local ground level value is replaced by the overall ground level value. Thus, since the local ground level value and the overall ground level value are the same after such a replacement, the base offset value has a value '0'.

Next, the gradation correcting unit 205 calculates normalized pixel values 'Rnrm', 'Gnrm', and 'Bnrm' (ACT 410). A normalized pixel value indicates a value obtained by removing a fixed value of a base color from a pixel value.

In other words, a normalized pixel value indicates a differential color value from which a fixed value of a base color has been removed for a pixel. When show-through occurs in a target pixel, the pixel value of the target pixel includes a color of a show-through image.

The gradation correcting unit 205 calculates the normalized pixel value based on the pixel value of the target pixel and the base offset value. In particular, the gradation correcting unit 205 obtains the normalized pixel value by subtracting the base offset value from the pixel value.

The gradation correcting unit 205 obtains the normalized pixel value Rnrm=R−Rofs. The gradation correcting unit 205 obtains the normalized pixel value Gnrm=G−Gofs. The gradation correcting unit 205 obtains the normalized pixel value Bnrm=B−Bofs.

A case in which a pixel value of the target pixel is '220, 215, or 230' is explained. As described above, the base offset value is (Rofs, Gofs, Bofs)=(−24, −24, −24). The gradation correcting unit 205 calculates a value 244 {=220−(−24)} as a normalized pixel R. The gradation correcting unit 205 calculates a value 239 {=215−(−24)} as a normalized pixel G value. The gradation correcting unit 205 calculates a value 254 {=230−(−24)} as a normalized pixel B value. As such, the normalized pixel values (Rnrm, Gnrm, Bnrm)=(244, 239, 254) are calculated by removal of the base color.

On the other hand, when the color space of image data is a subtractive mixture type, the base offset value is a positive value. Accordingly, the normalized pixel values will have a value smaller than the pixel values due to the subtracting of the (positive) base offset value from the pixel value.

The gradation correcting unit 205 utilizes the normalized pixel values as input values to a correction table, a correction function, or the like, and thereby obtains corrected pixel values 'Rx', 'Gx', and 'Bx' as output values (ACT 411). This correction process has been described above with reference to FIG. 3. As described above, the correction relies on a correspondence relationship in which a gradation value of a pixel is corrected to a higher value in a light density range.

In the present embodiment, the gradation correcting unit 205 uses the normalized pixel value as input for the correction process instead of the pixel value of the target pixel. In other words, the gradation correcting unit 205 uses the normalized pixel value (from which the base color has already been removed) as an input value for the correction process.

Since the base color is already removed from the pixel value being corrected, a pixel value of a background region can be considered to correspond to the light density range. In addition, when a show-through occurs in the target pixel, the pixel value of the target pixel indicates a color of a show-through image due to removal of the base color.

Accordingly, the normalized pixel value is corrected to a higher gradation value according to the gradation converting. As a result, a color of a bright image in the background region, that is, a likely color of the show-through image, is removed. In this manner, even when the base color of the target pixel is not white, the show-through image may still be removed or reduced.

For a pixel having high density, that is, a pixel whose base offset value is '0', a normalized pixel value having the same value as the pixel value is used in the correction process. In this case, since the normalized pixel value does not correspond to the light density range, the output value has the same value as the input value. In other words, the normalized pixel value is excluded from the gradation converting.

As such, a pixel having high density where show-through hardly occurs is excluded from the gradation converting.

As described above, the normalized pixel values obtained in process ACT 410 are values (Rnrm, Gnrm, Bnrm)=(244, 239, 254). The corrected pixel values when these normalized pixel values are input to the correction process (see FIG. 3) are values (Rx, Gx, Bx)=(254, 249, 254). As such, the corrected pixel values have high gradation values.

In process ACT 411, the gradation correcting unit 205 calculates output pixel values 'Ry', 'Gy, and 'By' based on the corrected pixel values and the base offset values. In particular, the gradation correcting unit 205 calculates the output pixel values by adding the corrected pixel values 'Rx', 'Gx,' and 'Bx' to the base offset values 'Rofs', 'Gofs', and 'Bofs'. In this manner, an output pixel value in which the base color has been restored to its original value with respect to the corrected pixel value is calculated.

The gradation correcting unit 205 obtains the output pixel value Ry=Rx+Rofs. The gradation correcting unit 205 obtains the output pixel value Gy=Gx+Gofs. The gradation correcting unit 205 obtains the output pixel value By=Bx+Bofs.

As described above, the base offset values are (Rofs, Gofs, Bofs)=(−24, −24, −24). Accordingly, the gradation correcting unit 205 calculates a value 230 {=254+(−24)} as the output pixel R value. The gradation correcting unit 205 calculates a value 225 {=249+(−24)} as the output pixel G value. The gradation correcting unit 205 calculates a value 230 {=254+(−24)} as the output pixel B value.

Accordingly, the output pixel values (Ry, Gy, By)=(230, 225, 230) in which a show-through image has been removed or reduced are calculated. Also, in this example, the pixel RGB values of the target pixel are values 220, 215, 230, respectively. As such, in this instance, a pixel not having a white background is corrected by the gradation converting according to the correction processing.

When the color space of image data is a color space of a subtractive mixture, the base offset value is a positive value. Accordingly, the output pixel value has a value greater than the corrected pixel value since the (positive) base offset value is added to the corrected pixel value.

The gradation correcting unit 205 increments the position to the next target pixel in the raster scan direction (ACT 412). The gradation correcting unit 205 determines whether a newly selected pixel is within the range of the image data (ACT 413). When the target pixel is within the range of image data (YES in ACT 413), the gradation correcting unit 205 repeats ACT 402 to ACT 412.

FIG. 8 is a diagram for explaining aspects of the correction processing of the present embodiment. As described with reference to the flowchart of FIG. 7, the normalized pixel value from which a base color has been removed from the pixel value is input to the correction process. A shaded region in the graph on the righthand side of FIG. 8 depicts a range in which pixel values will be shifted by removal of the base color. As such, the removal of the base color indicates that the correction is substantially shifted in a direction indicated by arrow 503 in a conceptual manner at least.

According to the graph on the righthand side, the pixel values 501 and 502 now correspond to the light density range after the conceptual shifting of the correction table. As a result, the pixel values 501 and 502 are targets of the gradation converting. That is, the pixel values 501 and 502 become the targets of the gradation converting after the removal of the base color therefrom.

FIG. 9 is a diagram illustrating an example of image data after a correction according to the present embodiment. Image data 301*a* is image data before the correction and image data 301*b* is image data after the correction.

In the example of FIG. 9, the relevant background color of the image data 301*a* is not a white background. Also, the density of a color 702 corresponding to a show-through image is higher than that of the base color 701 of the image data 301*a*. In this case, it is necessary to account for the base color 701 in order to remove the show-through image.

In this regard, in the present embodiment, the base color 701 is removed from the image data 301*a*, and then a gradation converting is performed to remove/reduce the show-through image. After the gradation converting, the base color 701 is added back to each relevant pixel value. Accordingly, as illustrated in the image data 301*b*, the base color 701 is maintained even though the color 702 of the show-through image may be close to the base color 701.

As described above, the image processing apparatus according to the present embodiment includes a reading unit, such as the scanner 201), and a control unit, such as the CPU 202 and the GPU 208. The reading unit generates image data by scanning a document or the like. The control unit performs processes on each of a plurality of pixels included in image data.

In general, a control unit obtains a normalized pixel value according to a base offset value and a pixel color value of a target pixel. The base offset value is a difference between an overall ground level value indicating a base color of the document and a local ground level value, which is a value based on each of several neighboring pixel values around the target pixel.

The control unit obtains a corrected pixel value corresponding to the normalized pixel value based on a correction table or the like. Also, the control unit obtains an output pixel value based on the corrected pixel value and the base offset value.

As such, the image processing apparatus obtains the base offset value indicating a base color of the pixel. The image processing apparatus obtains the normalized pixel value from which the base color is removed from the pixel value using the base offset value. The image processing apparatus performs a correction using the normalized pixel value as an input to the correction table.

As a result, gradation converting may be performed even on image data having a base color that is not white by first removing the base color from the image data. Accordingly, even when a base color is a color other than white, a color of a show-through image of the image data may also approach the base color. Therefore, the show-through image may be prevented or reduced.

Also, the image processing apparatus obtains the local ground level value according to neighboring pixel values of a plurality of neighboring pixels of a target pixel. In particular, the image processing apparatus obtains a neighboring pixel value whose brightness is higher than the target pixel value as the local ground level value. Accordingly, a base color surrounding the target pixel may be appropriately obtained.

The local ground level value may ultimately be set to a neighboring pixel value having a brightness greater than the target value, or a neighboring pixel value for which the difference between the pixel value of the target pixel and the neighboring pixel value is less than or equal to a predetermined threshold value. Accordingly, even when the surrounding region of the target pixel includes base colors of a plurality of hues, the local ground level value may be appropriately obtained even when the base color hue is close to the target pixel.

Modified Example

The image processing apparatus may generate low resolution image data from the image data, and obtain a local ground level value according to the low resolution image data. In this case, the image processing apparatus may obtain pixel values for a plurality of low resolution pixels in the low resolution image data, which correspond to positions of surrounding the target pixel in the image data. The image processing apparatus may obtain a local ground level value based on an evaluation of the low resolution pixels corresponding in general to positions of pixels neighboring the target pixel in the image data.

The number of pixels of the low resolution image data is smaller than that of the original image data. Thus, the image processing apparatus is able to obtain a local ground level value using smaller number of pixels. Accordingly, the local ground level value may be obtained more efficiently and/or at a high speed.

In the above example embodiments, the processes of the control unit are substantially realized by hardware, but the disclosure is not limited thereto. The various processes of the control unit may be realized by software in whole or in part. A CPU 202 executes a program stored in a memory, such as ROM or the like, to implement the processes of the local ground level detecting unit 204 and the gradation correcting unit 205.

While certain embodiments have been described, these embodiments have been presented by way of examples only, and are not intended to limit the scope of the present disclosure. Indeed, the novel embodiments described herein may be embodied in a variety of other forms; and furthermore, various omissions, substitutions, and changes in the form of the embodiments described herein may be made without departing from the spirit of the present disclosure. The accompanying claims and their equivalents are intended to cover such forms and modifications as would fall within the scope and spirit of the present disclosure.

What is claimed is:

1. An image processing apparatus, comprising:
a scanner to generate image data by scanning a document, the image data comprising a plurality of pixels, each respectively having a first pixel value; and
a control unit configured to:
set, for each pixel in the image data, a second pixel value based on the first pixel value of the pixel and a first difference between a first base value corresponding to a base color of the document and a second base value that is based on neighboring first pixel values of a plurality of neighboring pixels around the pixel,
use a correction table to obtain, for each pixel in the image data, a corrected second pixel value, and
set a third pixel value based on the corrected second pixel value and the first difference.

2. The image processing apparatus according to claim 1, wherein the control unit sets a neighboring pixel value having a brightness for each color that is highest among neighboring pixel values as the second base value.

3. The image processing apparatus according to claim 1, wherein the control unit sets a neighboring pixel value having a brightness that is highest and for which a difference between the neighboring pixel value and the first pixel value is less than or equal to a first threshold value as the second base value.

4. The image processing apparatus according to claim 1, wherein the control unit sets the third pixel value for the pixels for which a difference between the first pixel value and the first base value is less than or equal to a second threshold value.

5. The image processing apparatus according to claim 1, wherein
the control unit sets the second pixel value by subtracting the first difference from the first pixel value, the first difference being obtained by subtracting the first base value from the second base value, and
the control unit sets the third pixel value by adding the first difference to the corrected second pixel value.

6. The image processing apparatus according to claim 5, wherein the first difference is a negative value when the first pixel value is expressed according to a color space of an additive mixture and a positive value when the first pixel value is expressed according to a color space of a subtractive mixture.

7. The image processing apparatus according to claim 1, wherein the pixel values before correction having a brightness equal to or greater than a certain value are associated in the correction table to a pixel value after correction having a highest brightness.

8. The image processing apparatus according to claim 1, wherein the control unit is configured to:
generate low resolution image data based on the image data, and
obtain the second base value based on a plurality of low resolution pixels from the low resolution image data at positions corresponding to the plurality of neighboring pixels.

9. The image processing apparatus according to claim 1, wherein the image data is RGB data.

10. The image processing apparatus according to claim 1, wherein each pixel in the image data has a pixel value for each of a plurality of different color channels.

11. An image processing apparatus, comprising:
a scanner to generate image data by scanning a document, the image data comprising a plurality of pixels, each respectively having a first pixel value, the document having a first base value corresponding to a background color of the document; and
a control unit configured to:
set, with respect to each pixel included in the image data, a second pixel value by subtracting a first difference from the first pixel value of each respective pixel, the first difference being obtained by subtracting the first base value from a second base value corresponding to neighboring pixel values of a plurality of neighboring pixels around the respective pixel,
use a correction table to obtain a corrected second pixel value corresponding to the second pixel value, and
set a third pixel value for each respective pixel by adding the first difference to the corrected second pixel value.

12. The image processing apparatus according to claim 11, wherein the correction table matches pixel values brighter than a certain brightness value to a highest brightness pixel value.

13. The image processing apparatus according to claim 11, wherein the image data is RGB data.

14. The image processing apparatus according to claim 11, wherein the control unit is configured to convert the image data from the scanner to lower resolution image data having fewer total pixels and determine the second base value using the lower resolution image data.

15. The image processing apparatus according to claim 11, wherein the control unit is configured to calculate a corrected pixel value for each color channel in the image data.

16. An image processing method, comprising:
generating image data by scanning a document, the image data comprising a plurality of pixels, each pixel respectively having a first pixel value corresponding a brightness of the pixel, the document having a base color;
setting a second pixel value for each pixel based on the first pixel value of the pixel and a first difference between a document base value corresponding to the base color of the document and a local base value corresponding to pixel values of a plurality of neighboring pixels of the pixel;
obtaining a corrected second pixel value corresponding to the second pixel value using a correction table; and
setting a third pixel value for each pixel based on the corrected second pixel value of the pixel and the first difference.

17. The image processing method according to claim 16, further comprising:
generating lower resolution image data from the image data, the lower resolution image data having fewer pixels total than the image data; and
determining the local base value using the lower resolution image data.

18. The image processing method according to claim 16, wherein the image data is RGB data.

19. The image processing method according to claim 16, wherein each pixel in the image data has a pixel value for each of a plurality of different color channels.

20. The image processing method according to claim 16, further comprising:
printing an image on a sheet using the third pixel values for each pixel in the image data.

* * * * *